Aug. 10, 1971
C. E. TEMPLER
3,598,534
MIXING DEVICE
Filed July 29, 1968
2 Sheets-Sheet 1
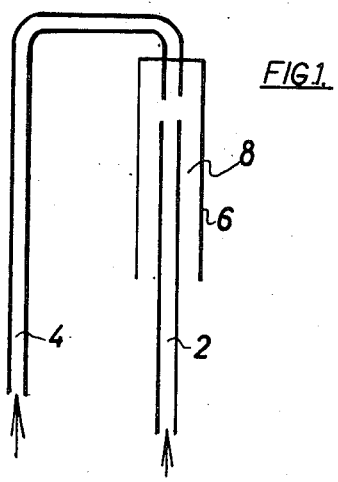
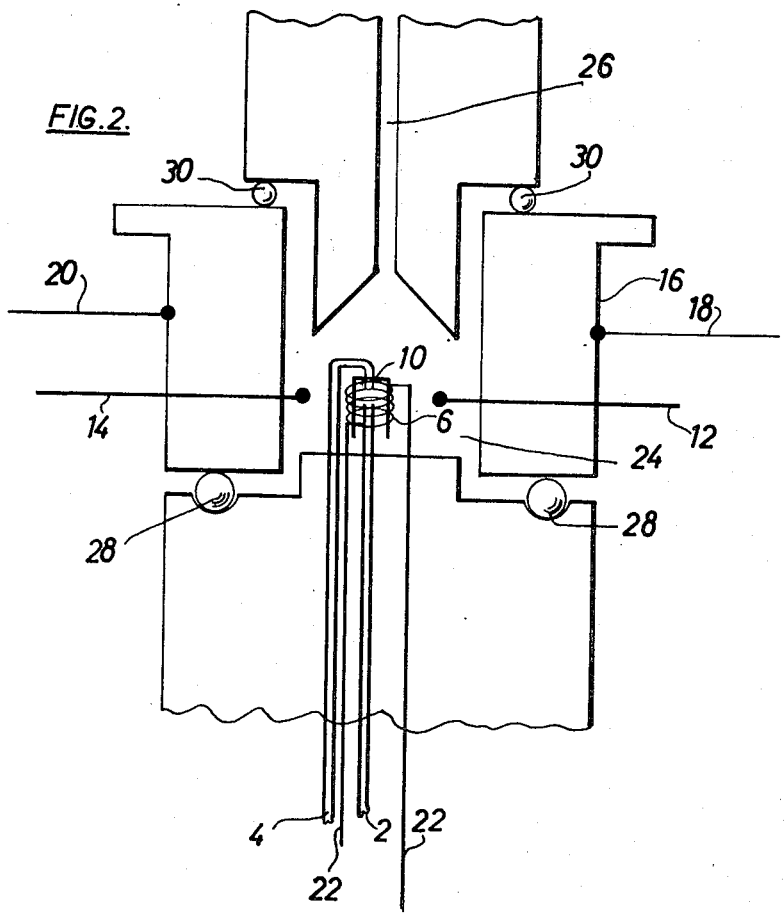
INVENTOR:
CHARLES E. TEMPLER
BY
Bruns, Schuyler & Burridge
ATTORNEYS Aug. 10, 1971 C. E. TEMPLER 3,598,534
MIXING DEVICE Filed July 29, 1968 2 Sheets-Sheet 2

INVENTOR:
CHARLES E. TEMPLER
BY
Bruner, Schuyler & Burridge
ATTORNEYS

United States Patent Office 3,598,534
Patented Aug. 10, 1971

3,598,534
MIXING DEVICE
Charles E. Templer, 20 Mattock Lane,
Ealing, London, W. 5, England
Filed July 29, 1968, Ser. No. 748,292
Claims priority, application Great Britain, Aug. 5, 1967,
36,052/67
Int. Cl. G01k 17/00; G01n 25/48
U.S. Cl. 23—253
9 Claims

ABSTRACT OF THE DISCLOSURE

A mixing device is provided for mixing small quantities of liquids together in which at least two tubes pass into a larger tube closed at one end, the open end of each tube within the larger tube almost meeting and preferably facing the open end of each other tube. The device is used in microcalorimeters for determining heats of reaction.

This invention relates to a device for thoroughly mixing small quantities of liquids.

When carrying out liquid/liquid or solute/solute physical or chemical interactions using very small quantities of materials, for example in the measurements of heats of reaction, it is very difficult to ensure thorough mixing of the two liquids.

According to the present invention a device for mixing liquids in small quantities comprises at least two fine tubes of inert material passing into a larger tube which is open at one end and closed at the other end, the open end of each tube within said larger tube almost meeting and preferably facing the open end of each other tube.

It is preferred that one of the fine tubes enters the larger tube through its open end, thereby forming a fine annular space through which the liquids flow out of the tube and are thoroughly mixed in the process.

The tubes are preferably arranged in such a way that the annular space is vertical and the liquids may pass out either upwardly or downwardly.

In order to assist the mixing a wire may be inserted in the fine tubes which almost fits the bore of the fine tubes. The wire extends into the open end of each of the two fine tubes.

The fine tubes are preferably made of stainless steel.

The invention will be further illustrated by reference to the accompanying drawings, in which:

FIG. 1 shows a mixing device according to the invention,

FIG. 2 shows a microcalorimeter employing the mixing device of FIG. 1,

Figure 3:
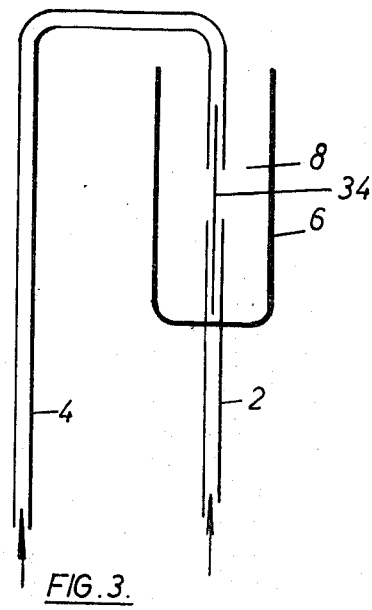
FIG. 3 shows a further embodiment of a mixing device according to the invention.

Referring to FIG. 1, stainless steel tubes 2 and 4 almost meet inside tube 6 which is arranged to form an annular passage 8 with tube 2. A liquid is passed through tubes 2 and 4 in the direction of the arrows. The two liquids are thoroughly mixed within tube 6 and pass through passage 8 and out of the bottom open end of tube 6.

Referring now to FIG. 2 the microcalorimeter includes a mixing device generally designated by numeral 10. In the vicinity of mixing device 10 are two measuring thermistors 12 and 14 and outside calorimeter 16 which is made of an insulating material such as PTFE are two reference thermistors 18 and 20. The distance between the measuring thermistor 12 and reference thermistor 18 is preferably less than 2 cm. Thermistors 14 and 20 are also preferably less than 2 cm. apart. Any heat generated due to mixing, reaction, etc., may be measured by virtue of the change in resistance of the measuring thermistors compared to the reference thermistors, by connection in the form of a Wheatstone bridge circuit to a suitable amplifier and recorder system. Thermistors 12 and 18 are a matched pair and thermistors 14 and 20 are a matched pair.

In addition to the measurement of heats of mixing and heats of reaction it is also possible to measure heats of adsorption. In this case a pure liquid is fed in through one fine tube. After thermal equilibrium is established a solution of a surface active substance in the same fluid is fed in through the second tube and the flow of the pure fluid is then stopped. The space surrounding the mixing device is filled with an adsorbent and the heat of adsorption is measured by means of the thermistors. Where the concentration of surface active agent is such that a heat of mixing occurs, this may be determined independently as described elsewhere in this application.

The outside of the mixing device is electrically insulated, e.g. with P.T.F.E., and wound with fine insulated resistance wire 22 so that defined quantities of heat may be introduced into the cell at the mixing chamber. This permits direct calibration in terms of energy units introduced under the conditions of a particular experiment.

The two liquids enter via tubes 2 and 4 and mix in tube 6. The mixed liquid then enters chamber 24 and flows upwards through the cell and eventually out of the calorimeter through exit 26.

It is preferred that the whole assembly can be easily dismounted for cleaning and accordingly the mixing device and heating coil assembly is fixed by O ring seal 28 and the outlet means is fixed by O ring seal 30.

The space surrounding the mixing device may be filled with a suitable inert heat conducting packing material.

FIG. 3 shows a modified form of the device shown in FIG. 1. The two liquids enter tubes 2 and 4 in the direction of the arrows. Wire 34 is inserted into the open ends of the tubes at their outlet ends. The two liquids mix in tube 6 and pass through passage 8 and out of the open top end of tube 6.

Figure 4:
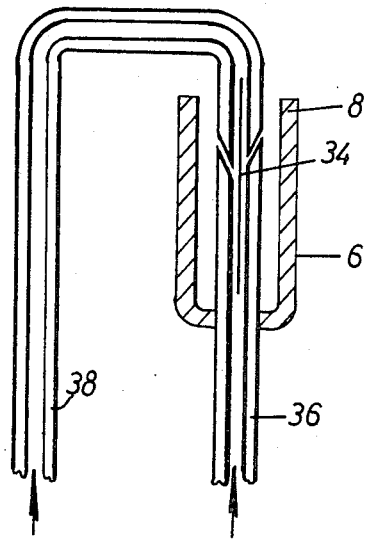
FIG. 4 shows a modified version of the device shown in FIG. 3.

FIG. 4 shows a further modification. The two liquids enter tubes 36 and 38 in the direction of the arrows. Wire 34 is inserted into the open outlet ends of the two tubes. The outlet end of tube 36 is coned and the outlet end of tube 38 is tapered so that very good mixing occurs before the liquids pass through passage 8 and out at the top of tube 6.

Figure 5:
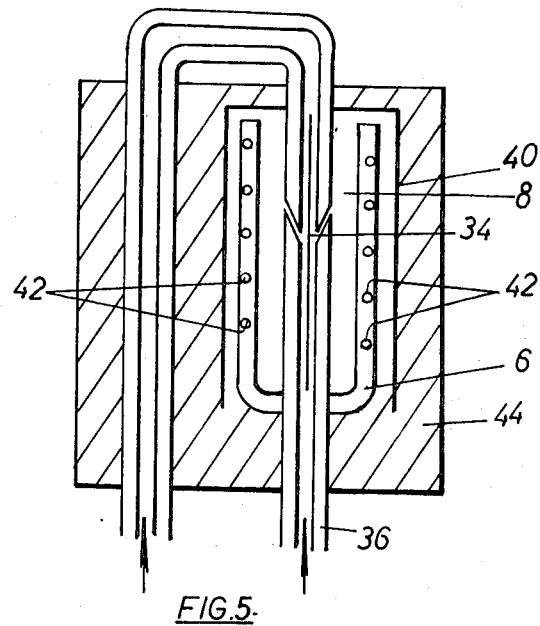
FIG. 5 shows a further modification of the device shown in FIG. 4.

FIG. 5 shows still further modifications of the device. The initial stages of mixing in this modification are the same as shown in FIG. 4. However, tube 6 is sheathed by tube 40 which is closed at the top while tube 6 is open at the top. The two liquids are thus forced downwards on the outside of tube 6 which advantageously has a narrow spiral 42 in the outer side thereof. This spiral path is not essential but further assists the mixing. If desired a straight path may be in the outer side of tube 6. The two liquids emerge at the bottom open end of tube 40 and then travel upwards again through inert packing material 44 which may be copper powder.

The outside of tube 6 may be fitted with a P.T.F.E. close fitting sheath to assist the liquids in following spiral path 42.

Each of the devices shown in FIGS. 3, 4 and 5 may be substituted in FIG. 2 for the device of FIG. 1. In each case a calibration coil may be used.

Each of the devices shown in the drawings has the entrances for the two liquids at the bottom end. If desired one or both liquids may be fed in from the top with appropriate modifications of the device.

In supplying small quantities of liquid, most ordinary pumps are ineffective. This problem can be overcome by using a two-channel syringe pump. An alternative method is to employ two reservoirs for the liquids, pressurised with an inert gas such as argon or other gases, the pressure being maintained constant using a mercury pressurestat. The liquid is then fed via filters and control capillaries to the mixing device.

While the device according to the invention has been described in relation to the mixing of two liquids, it is obvious that more tubes can be provided to meet within the same mixing tube if more than two liquids are to be mixed. In this case, only one tube need enter the mixing tube through its open end to form the annular passage.

Further with regard to the calorimeter, it is possible to use more than two measuring thermistors or thermocouples. In order to follow slow reactions more completely additional thermistors or thermocouples may be added above the two described with reference to FIG. 2.

I claim:

1. A mixing device for thoroughly mixing small quantities of liquids in a microcalorimeter including a heat insulating chamber, at least one measuring thermistor within said microcalorimeter in the vicinity of said mixing device, and at least one reference thermistor outside said heat insulating chamber, said mixing device comprising, at least two fine tubes of inert material for carrying said liquids to be mixed extending into said chamber, and a larger tube having an open end and a closed end, said fine tubes extending into and having their open ends disposed within said larger tube, the open ends of said fine tubes being fixed with their open ends opposed and in close proximity to one another so as to almost meet within said larger tube, one of said fine tubes entering said larger tube through its open end, said larger tube being only slightly larger than said fine tubes thereby forming with said one fine tube a fine annular space through which the combined liquids flow out of said larger tube.

2. A device according to claim 1 further comprising a calibration heating coil wound around said larger tube.

3. A device according to claim 1 wherein an inert heat conducting powder is arranged around said larger tube.

4. A device according to claim 1 further comprising a wire inserted in the open end of each of the fine tubes which almost fits the bore of said fine tubes.

5. A device according to claim 1 wherein the open end of one fine tube is coned and the open end of a second fine tube is tapered.

6. A device according to claim 5 further comprising a cover tube fitted outside the larger tube and arranged to cause the combined liquids to flow between the larger tube and the cover tube.

7. A device according to claim 6 further comprising a narrow spiral channel formed in the outer surface of said larger tube defining a path along which the liquids flow.

8. A device according to claim 6 further comprising a narrow substantially straight channel formed in the outer surface of said larger tube defining a path along which the liquids flow.

9. A device according to claim 1 further comprising an adsorbent arranged around said larger tube.

References Cited

UNITED STATES PATENTS

| | | | |
|---|---|---|---|
| 1,460,727 | 7/1923 | Moch | 4—192 |
| 2,652,234 | 9/1953 | Feldman | 259—4 |
| 3,285,712 | 11/1966 | Matasa et al. | 259—4X |
| 3,391,908 | 7/1968 | MacDonald | 259—4 |
| 3,436,190 | 4/1969 | Priestley | 73—190X |
| 3,467,501 | 9/1969 | Groszek | 73—190 |

JAMES J. GILL, Primary Examiner

H. GOLDSTEIN, Assistant Examiner

U.S. Cl. X.R.

23—259, 292, 253PC; 73—190; 259—4